Feb. 2, 1937.  H. WINGET  2,069,467
FRICTION CLUTCH
Original Filed June 8, 1933   3 Sheets-Sheet 3
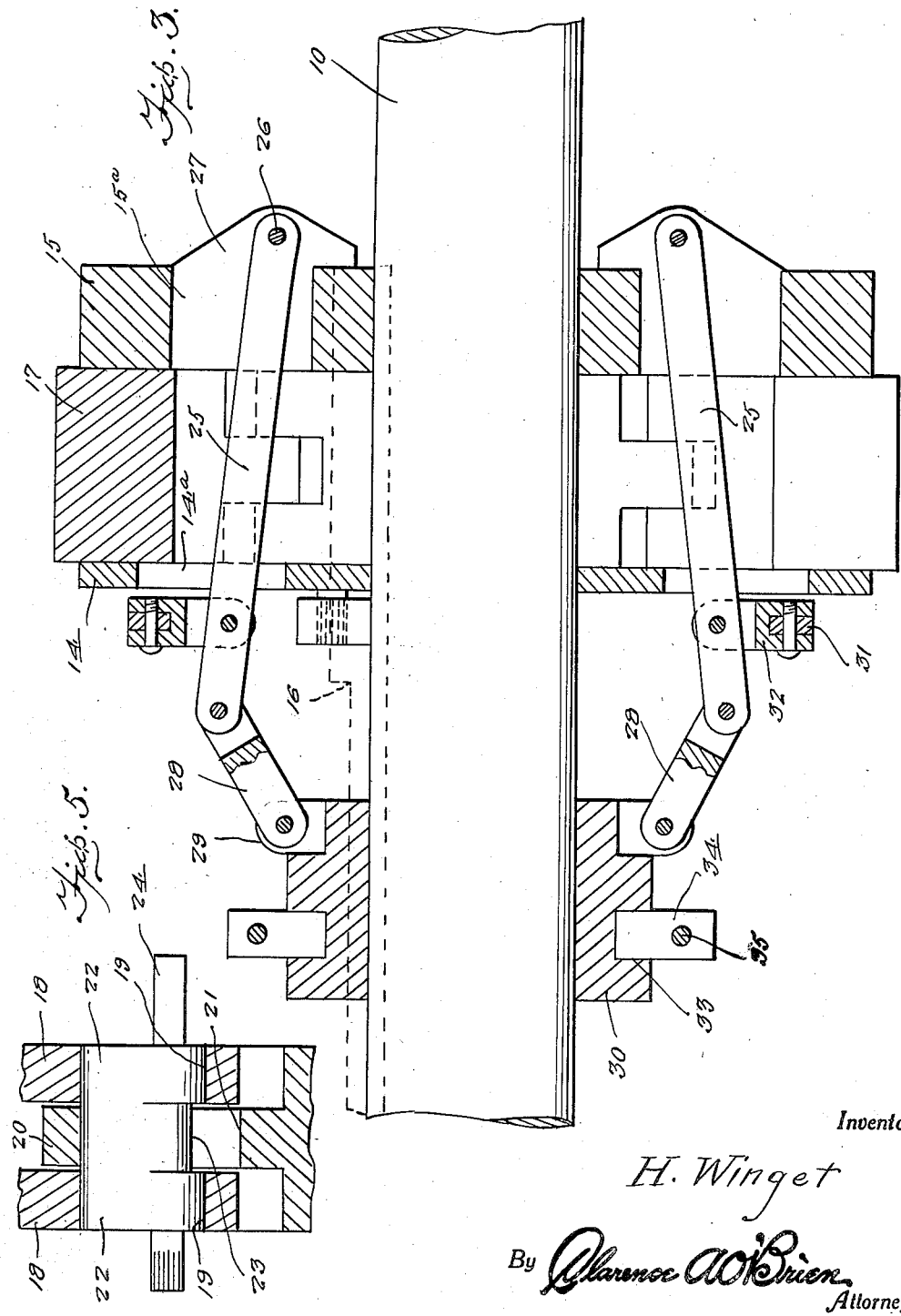
Inventor
H. Winget
By Clarence A. O'Brien
Attorney Patented Feb. 2, 1937

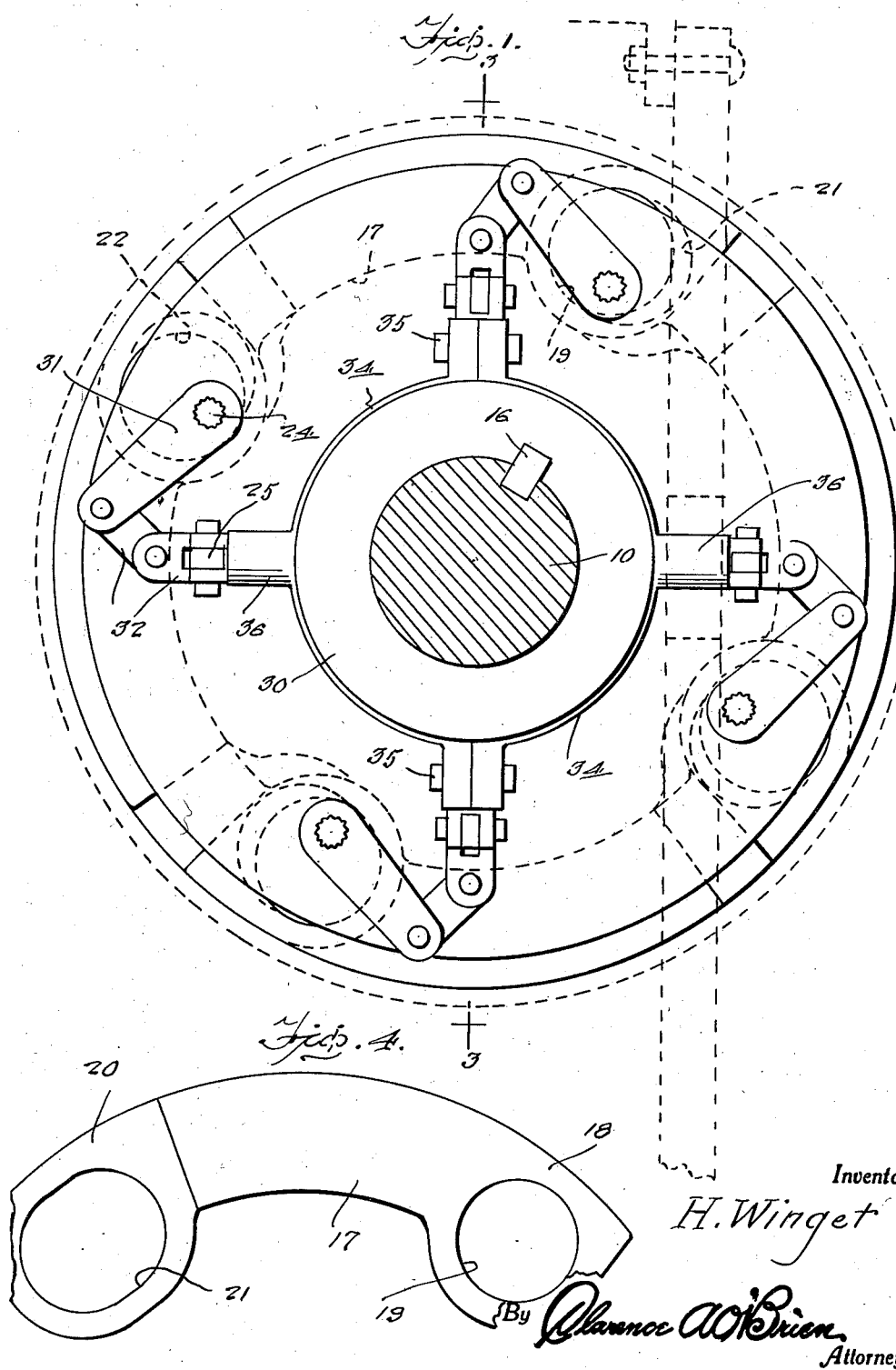

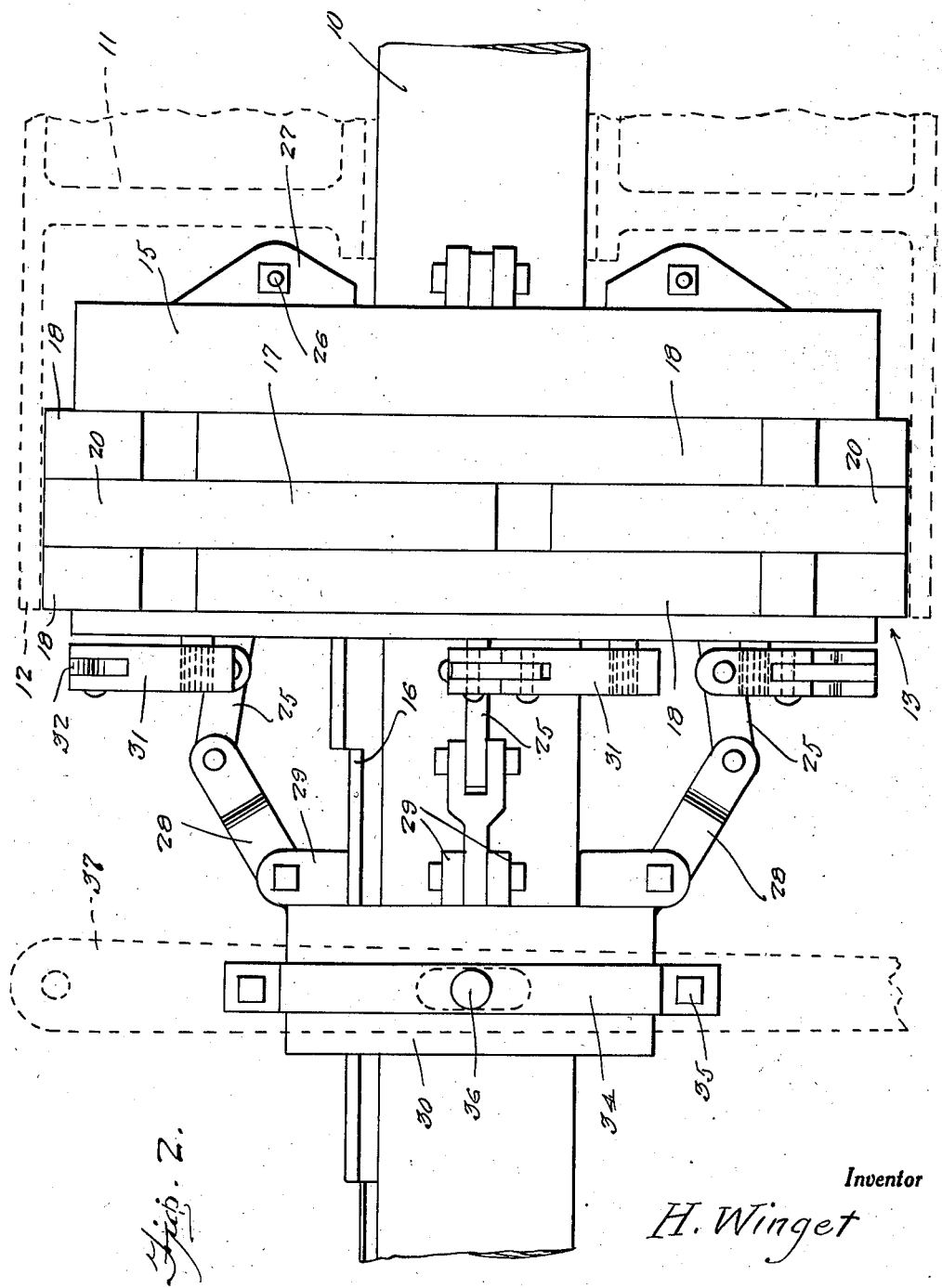

2,069,467

UNITED STATES PATENT OFFICE 2,069,467

FRICTION CLUTCH

Horatio Winget, Waterloo, Ill.

Refiled for abandoned application Serial No. 674,925, June 8, 1933. This application September 24, 1936, Serial No. 102,431

2 Claims. (Cl. 192—75)

This invention relates to friction clutches of the type particularly adapted for use on internal combustion engines or line shafts for operatively connecting a belt pulley to the shaft to provide a drive connection between the shaft and the belt pulley.

An object of the present invention is to provide a clutch of the character above mentioned which is composed of comparatively few parts, can be easily thrown into and out of operation while the driving element or shaft is being rotated, and which will effectively grasp the mechanism or pulley to be gripped, insuring maximum friction contact between the shoes of the clutch and the inner surface of the pulley or driven mechanism.

This application is a substitute for my allowed and forfeited application Serial No. 674,925 filed June 8, 1933 and entitled Friction clutch.

The invention together with its numerous objects and advantages will be best understood from a study of the following description, taken in connection with the accompanying drawings wherein is illustrated a preferred embodiment of the invention.

It is to be understood that it is in no wise intended to restrict the invention to the precise details of construction, combination and arrangement of elements other than may be necessary to meet the requirements of the prior art and scope of the appended claims.

In the drawings:

Figure 1 is an end elevational view of the clutch.

Figure 2 is a side elevational view thereof.

Figure 3 is a sectional view taken substantially on the line 3—3 of Figure 1.

Figure 4 is a side elevational view of a clutch shoe, and

Figure 5 is a fragmentary detail sectional view taken through the joint between the ends of adjacent shoes.

Referring to the drawings by reference numerals it will be seen that 10 indicates generally a portion of a shaft, which may be a portion of the drive shaft of an internal combustion engine, or a portion of a line shaft. Rotatably mounted on the shaft 10 is a pulley of the type suggested by broken lines in Figure 2 and designated generally by the reference numeral 11. In the present instance the pulley 11 which may be considered the driven element of the clutch has a portion 12 of its rim provided with a finished inner periphery to serve as a clutch surface.

In accordance with the present invention the driving element, designated as a whole by the reference numeral 13 comprises a spider or body portion consisting of two circular plates 14, 15 secured in spaced relation on the large end of a key 16, and through the medium of the key 16 engaged with the shaft 10 to rotate therewith. Arranged between the plates 14, 15 is a series of shoes 17, and in the present instance there are four of such shoes 17. The shoes 17 are arranged for floating movement between the plates 14, 15 and are constrained thereby to shift radially outwardly into frictional engagement with the inner periphery of the pulley rim 12 to provide a drive connection between the driving element 13 and the driven element or pulley 11; and to move radially inwardly out of frictional engagement with said rim 12 to interrupt said drive connection.

The shoes 17 are identical in form and construction and as shown in Figures 4 and 5 each shoe 17 includes an arcuate body enlarged and bifurcated at one end to provide spaced parallel ears 18 apertured as at 19; while at a relatively opposite end the body 17 is reduced in thickness to provide a tongue or extension 20 to fit between the ears 18, and this extension 20 is provided with a cam slot 21.

The openings 19 and 21 constitute bearings for eccentrics 22 through the medium of which the shoes are operatively connected together. As shown in Figure 5 the ends of the eccentrics 22 fit more or less snugly within the openings 19 while the intermediate eccentric portions 23 operate in the slots 21.

The eccentrics 22 are mounted on eccentric shafts 24, the ends of which are journalled in suitable bearings provided therefor on the plates 14, 15.

Levers 25 have end portions operating in openings 14a provided in plate 14, and openings 15a provided in plate 15. At one end thereof the levers 25 are pivoted as at 26 between pairs of ears 27 on the plate 15. At their free ends the levers 25 are pivotally connected through the medium of links 28 to pairs of ears 29 provided at one end of a collar 30 and collar 30 as shown is connected through the medium of the key 16 with the shaft 10 to rotate with the shaft, and at the same time permit axial sliding movement of the collar relative to the shaft.

The eccentric shafts 24 are provided on one end thereof with arms or cranks 31 operatively connected at one end through the medium of links 32 with the levers 25 for turning the shafts 24 to move the shoes 17 into and out of engagement with the rim 12 upon sliding movement of the collar 30.

Rotatably mounted on the collar 30 within a groove 33 provided in said collar is a two part ring the sections 34 of which at their meeting ends are secured by bolts or the like 35. Each of the parts 34 of the ring is provided with a stud 36 engaged by the hand lever 37 shown by dotted lines in Figures 1 and 2. It will be seen that when the hand lever 37 is swung to slide the collar 30 along the shaft 10 towards the clutch element 13, or to the right as viewed in Figure 2, rotative movement is transmitted to the shafts 24 through the link connections between the levers 25 and the shafts, the links 25 being caused to swing radially on their pivots 26 upon said movement of the collar 30 in the direction stated. The rotation of the shafts 24 will through the medium of the eccentric connections between said shafts and the connected ends of the shoes cause the shoes to move radially outwardly into frictional engagement with the inner peripheral surface of the rim 12 and thereby provide a drive connection between the driving element 13 of the clutch and the driven element or hub 11 for driving the hub from the shaft 10. Manifestly upon reverse sliding movement of the collar 30, that is a movement of the collar to the left in Figure 2 the operation will be reversed and the shoes 17 drawn inwardly out of frictional engagement with the pulley rim 12, to release the drive connection between the driving and driven elements of the clutch.

It will be noted that the levers 25, links 28, links 32, and arms 31 constitute means by which the collar 30 is positively connected with the eccentric shafts 24, and whereby the shoes 17 may be positively moved into and out of contact with the rim 12.

What is claimed is:

1. In a clutch, a driving member and a driven member, said driving member including a pair of spaced apertured plates, a circular series of eccentric shafts journalled between said plates, shoes arranged between said shafts, eccentrics on said shafts and engaging the ends of the shoes for moving the shoes radially into and out of frictional engagement with the driven member, levers extending through alined apertures in said plates and pivoted at one end to one of said plates, means operatively connected with the free ends of the levers for rotating them upon their pivots, and motion transmitting means connecting said levers with the eccentric shafts for projecting and retracting said shoes.

2. In a clutch of the character described, a driving member, and a driven member, said driving member including a pair of spaced apertured plates, eccentric shafts journalled between said plates, eccentrics on said shafts, segments supported between the shafts and engageable with the eccentrics, levers operating in the apertures in said plates and pivoted at one end to one of said plates, motion transmitting means operatively connecting the free ends of the levers with said shafts for rotating the latter, and means movable axially toward and away from said driven member and operatively connected with said levers for swinging the levers about said pivots to project and retract said segments.

HORATIO WINGET.